July 28, 1936.　　　　E. D. TILLYER　　　　2,049,095
OPHTHALMIC LENS
Filed March 5, 1934　　　4 Sheets-Sheet 1
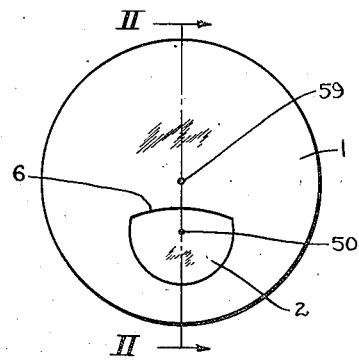
FIG. I.
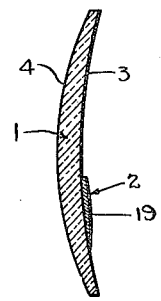
FIG. II.
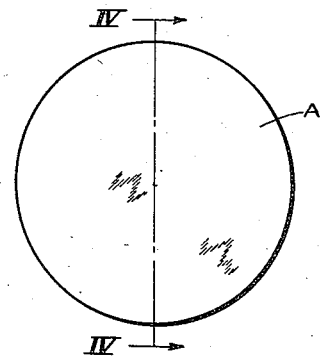
FIG. III.
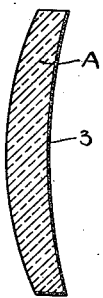
FIG. IV.
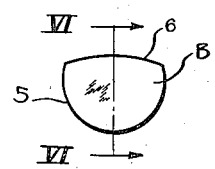
FIG. V.　FIG. VI.
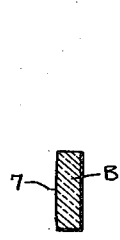
FIG. VII.
FIG. VIII.
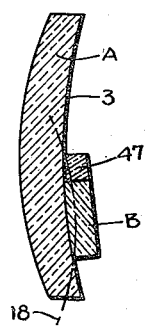
FIG. IX.
INVENTOR
Edgar D. Tillyer
BY
Harry H. Styll
ATTORNEY July 28, 1936.   E. D. TILLYER   2,049,095
OPHTHALMIC LENS
Filed March 5, 1934    4 Sheets-Sheet 2
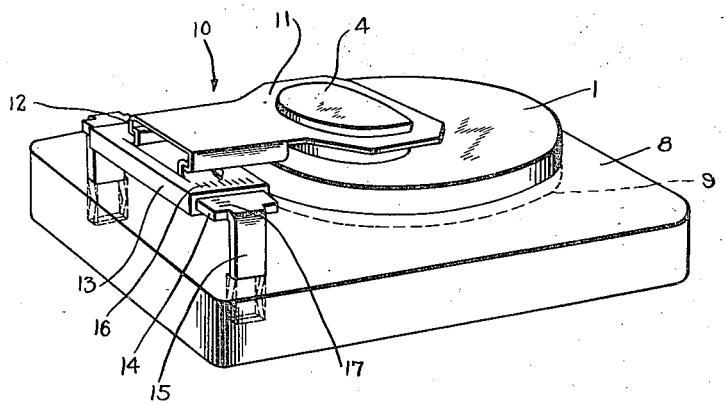
FIG. X.
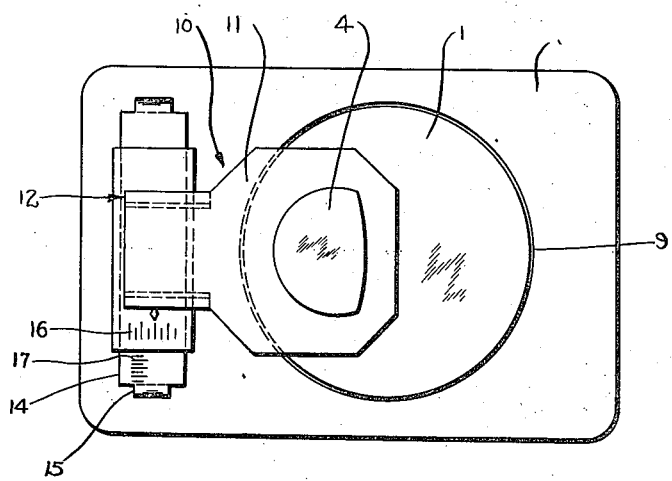
FIG. XI.
INVENTOR
Edgar D. Tillyer
BY
Harry H. Styll
ATTORNEY

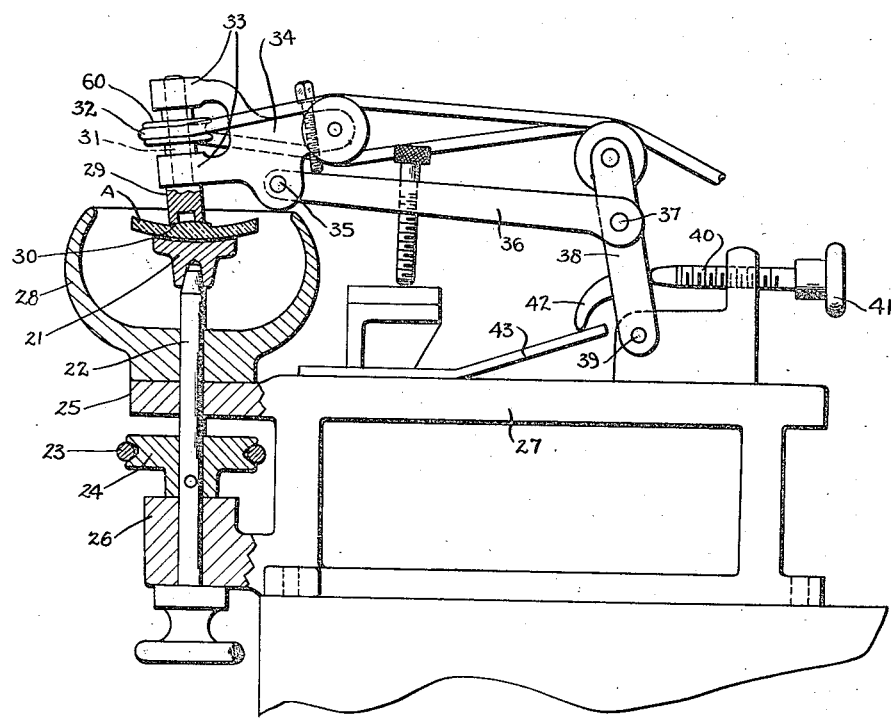
FIG. XII.
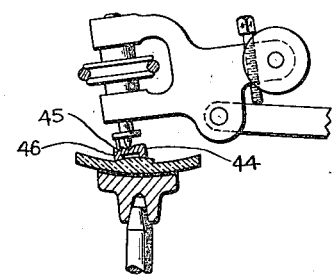
FIG. XIII.

July 28, 1936. E. D. TILLYER 2,049,095
OPHTHALMIC LENS
Filed March 5, 1934 4 Sheets-Sheet 4
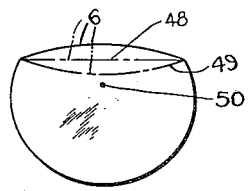
FIG. XIV.
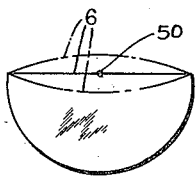
FIG. XV.
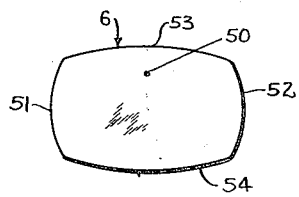
FIG. XVI.
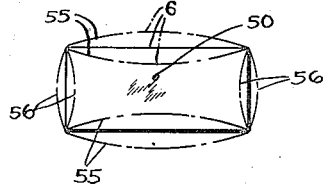
FIG. XVII.
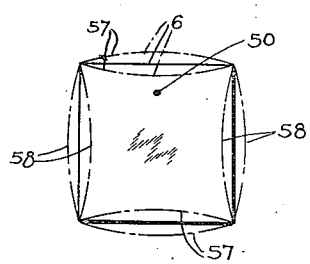
FIG. XVIII.
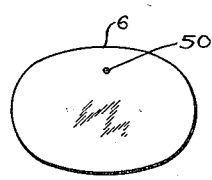
FIG. XIX.
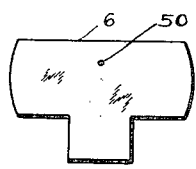
FIG. XX.
INVENTOR
Edgar D. Tillyer
BY
Harry H. Styll
ATTORNEY Patented July 28, 1936

2,049,095

UNITED STATES PATENT OFFICE 2,049,095

OPHTHALMIC LENS

Edgar D. Tillyer, Southbridge, Mass., assignor to American Optical Company, Southbridge, Mass., a voluntary association of Massachusetts Application March 5, 1934, Serial No. 714,033

2 Claims. (Cl. 88—54)

This invention relates to improvements in ophthalmic lenses and has particular reference to improved means and processes of making bifocal or multifocal lenses.

One of the principal objects of this invention is to provide improved means and process of making bifocal or multifocal lenses of the type wherein the optical centers of the several fields are related to each other to best optical advantage and the expensive cost of production usual in lenses of this character will be greatly reduced.

Another object is to provide improved means and process of making fused bifocal or multifocal lenses of this type wherein the said reading additions may be formed to desired size and shape prior to their being fused to the major portions of the lenses.

Another object is to provide an improved process of forming a bifocal or multifocal lens wherein the part forming the distance portion of the lens may be provided with a finished optical surface similar to a prior art single vision lens and the part forming the reading portion of the lens and which is to be fused to the distance portion may first be provided with the contour shape desired and then be fused to the distance portion without distorting or otherwise destroying the contour shape thereof or injuring the finished optical surface on said distance portion.

Another object is to provide an inexpensive bifocal or multifocal lens with ideal optical properties and a simple and efficient process of making the same.

Another object is to provide improved means and process of forming a bifocal or multifocal lens whereby the position of the optical center of the reading field with respect to the optical or geometrical center of the distance field can be definitely controlled.

Another object is to provide improved means and process whereby the position of the dividing line between the reading and distance fields of such lenses can be controlled with respect to the optical or geometrical centers of said fields.

Another object is to provide improved means and process of forming a bifocal or multifocal lens having a prism power or correction in the reading field, and to enable the amount and position of the prism to be accurately controlled independently of the contour shape of the reading field, so that any desired shape may be employed with any desired amount of prismatic power within reasonable limits and with the base of the prism in any desired direction.

Another object is to provide improved means and process of forming a bifocal or multifocal lens wherein the distance field may be formed with any desired surface curvature prior to having the reading portion or segment secured thereto and which will enable the forming of any desired surface curvature on said reading portion or segment after it has been secured to the distance field.

Another object is to provide an improved process of uniting the parts of a bifocal or multifocal lens having finished surfaces thereon by fusing wherein the said parts and finished surfaces will not become distorted or otherwise injured during the fusing operation.

A further object is to provide simple, efficient and economical means of producing bifocal or multifocal lenses having incorporated therein a plurality of advantageous features which have hitherto been difficult and in many instances impossible to obtain in lenses of this character.

Other objects and advantages of the invention will become apparent from the following description taken in connection with the accompany drawings, and it will be understood that many changes may be made in the details of construction, arrangement of parts and steps of the process shown and described without departing from the spirit of the invention as expressed in the accompanying claims. I, therefore, do not wish to be limited to the exact details of construction and steps in the process shown and described, as the preferred forms only have been shown by way of illustration.

Referring to the drawings:

Fig. I is an elevation of a finished lens embodying the invention;

Fig. II is a sectional view taken on line II—II of Fig. I;

Fig. III is a front elevation of the major portion of the lens and illustrating one step in the process of manufacture;

Fig. IV is a sectional view taken on line IV—IV of Fig. III;

Fig. V is a front elevation of the segment portion of the lens after it has been finished to the desired contour shape;

Fig. VI is a sectional view taken on lines VI—VI of Fig. V;

Fig. VII is a view similar to Fig. VI showing a finished optical surface on one side of the segment portion;

Fig. VIII is a sectional view illustrating another step in the process of manufacture;

Fig. IX is a view similar to Fig. VIII showing a modified form of the invention;

Fig. X is a perspective view of a positioning block for supporting the parts of the lens in proper relation with each other during the fusing operation;

Fig. XI is a plan view of Fig. X;

Fig. XII is a side elevation of the device for performing the abrading operation showing portions thereof in sections;

Fig. XIII is a fragmentary side elevation of a modified form of abrading head;

Figs. XIV to XX inclusive illustrate some of several different shapes to which the contour of the reading field of the lens may be formed.

It has been usual in the past in forming bifocal or multifocal lenses wherein the reading fields have a wide entrance area for the eye and which will reduce the prismatic displacement when the eye passes from the distance field into the reading field and vice versa, to form the said lens from a single piece of glass commonly known in the art as a onepiece lens or by fusing a composite button or segment into a countersink or depression formed in a major piece of glass.

In instances wherein such lenses were formed from a single piece of glass much difficulty was encountered in forming the desired surface curvature over the distance portion of the lens and in forming the irregular contour and surface curvature desired for the reading portion of the lens. This difficulty was due primarily to the departure of the contour edge of the reading portion from a line of revolution.

In instances wherein such lenses were formed by fusing a composite button within a countersink or depression formed in a major piece of glass, much difficulty and expense was encountered because of the several separate fusing and abrading operations which were necessary to form the desired shape of segment. Such lenses, in most instances, required the use of several different kinds of glass which had to be carefully selected as regards indices of refraction, reciprocal relative dispersions, coefficients of expansion, etc., and each of the parts had to be carefully shaped, fitted and fused together edge to edge prior to their being fused within the countersink or depression. These factors rendered such lenses difficult and expensive to produce.

It, therefore, is one of the primary objects of this invention to obviate the above difficulties by providing improved means and processes of forming a bifocal or multifocal lens of the fused type wherein the part forming the distance portion of the lens may be provided with a finished optical surface similar to that formed on a blank for a prior art single vision lens, and the part forming the reading portion of the lens may first be shaped to the contour desired, then be fused to the finished surface on said distance portion, without distorting or otherwise destroying its contour shape or in any way injuring the finished surface on said distance portion, and may then be provided on its exposed surface with the surface curvature required to produce the power desired through the finished reading portion of the lens.

Referring more particularly to the drawings wherein like characters of reference designate like parts throughout the several views the major or distance portion 1 of the lens, as shown in Figures I and II, is formed in a manner similar to that of the usual prior art single vision lenses and may be formed flat or of a meniscus shape having a continuous optical surface 3 on one side thereof and a surface 4 on its opposite side which in practice is known as the prescription surface and is preferably put on only after the segment portion 2 has been secured to the optical surface 3. In forming the lens the major blank A as shown in Figures III and IV is first provided with a finished optical surface by usual prior art methods on the side thereof on which the segment 2 is to be secured, the surface in this instance being preferably the inner surface 3. This surface 3 may be formed spherical, toric, cylindrical, aspherical, or to any surface curvature desired, depending upon the correction desired in the distance portion of the finished lens. The portion of glass B forming the segment 2, as shown in Figures V to VII inclusive, is first moulded, ground, cut or otherwise shaped to the desired contour shape, the bottom and sides of which in this instance are a line of revolution, as indicated by the line 5, and the upper portion 6 which forms the dividing line between the different focal fields departs from said line of revolution and is arched slightly upwardly as indicated at 6. After the portion B has been formed to the desired contour shape, one of its surfaces, particularly that which is adapted to be fused to the surface 3 is provided by prior art methods with an optical surface 7 of the required curvature to fuse properly with the surface 3. After the parts have been formed as described above the major blank A forming the distance portion 1 of the lens is placed in a depression 9 formed in a refractory block 8 and is held by said block in predetermined relation with segment locating and supporting means 10, see Fig. X. The supporting means 10 is provided with a slide plate 11 having a recess therein in which the segment portion B is held and aligned with the major blank A. The plate 11 is slidably attached at 12 to a slideway formed on a transverse slide member 13 which is itself slidably mounted on a slide support 14. The slide support 14 is provided with depending spring leg members 15 which extend within spaced openings formed in the refractory block 8. The said depending members 15 are bent to provide a spring contact with the internal walls of the openings and provide means whereby the slide support 14, slide 13, and plate 11 carried thereby may be raised or lowered relative to the block 8.

The members 11 and 13 slide in opposite directions to each other and provide means whereby the segment portion B may be adjusted toward and away from the optical and/or geometrical center of the major blank A or moved sidewise relative to the vertical meridian of the blank to shift the segment to the right or left of said vertical meridian as desired. The amount of movement of the member 11 and the position of the portion B relative to the geometrical center of the blank 1 may be determined by suitable scale and indicator means 16 positioned in cooperative relation with each other on the members 11 and 13. The movement of the portion B to the right or left relative to the vertical meridian of the lens may be determined by a scale 17 formed on the slide support 14. This provides means whereby the portion B may be accurately located relative to the major portion A prior to fusing the said portions together. After the portions A and B have been properly located relative to each other, they are subjected to heat of the required temperature to cause the part B to fuse with the major blank A. Attention is directed to the fact that the slide plate 11 is supported out of engagement with the finished surface 3 of the major portion A during the fusing operation so as not to cause injury to said surface. The portion B is formed of glass having a lower melting point than the portion A so that the temperature necessary to bring about fusion will not be such as to cause the finished surface 3 to become distorted or otherwise injured during the fusing operation.

After the portion B has been fused with the major portion A the said portion B is abraded to the required surface curvature by prior art methods to produce the desired power in the finished reading portion 2 of the lens. This curvature is indicated by the dot and dash line 18 in Fig. VIII and by the full line 19 in Fig. II. The opposite face of the major portion A is then surfaced by prior art methods to the required curvature to produce the finished lens. This curvature is indicated by the dot and dash line 20 in Fig. VIII and by the full line 4 in Fig. II.

In the finished lens the sides and bottom or line of revolution 5 of the segment portion 2 is adapted to merge and blend with the surface curvature 3 of the distance field 1. The upper transverse portion 6 which departs from said line of revolution has a relatively thick edge and is adapted to form the line of joinder between the different focal fields of the finished lens.

The surfaces 3, 4, 7, and 19 are produced by means of abrading machines well known to the art and incorporating the use of both rigidly held and floating type ring and lap abrading tools, the rigidly held tools being preferably used to produce the shape of curve desired on said surfaces and the floating tools preferably to follow and to fine grind and polish said surfaces. A device incorporating the use of such tools and by which the said surfaces may be formed is shown in Figures XII and XIII.

In Fig. XII the blank A is shown attached by pitch or other suitable means to a lens holding member 21. Attention is directed to the fact that the lens blank A is attached to the lens holding member 21 so that the axis of rotation of the said lens holding member will pass through the point or location of the optical center of the reading portion 2 of the lens or the location at which the said optical center is to be formed in the finished lens. The lens holding member 21 is attached to a spindle 22 driven by a belt 23 and pulley 24. The spindle 22 is mounted within suitable bearings 25 and 26 formed on the main support frame 27 and is provided adjacent its tool supporting end with an abrasive bowl 28. An abrading tool 29 which in this instance is of the rigid type having a ring type abrading face 30 is supported in cooperative relation with the reading portion of the lens which is to be abraded. The abrading tool 29 is attached to a spindle 31 driven by a belt 32 and pulley 60. The spindle 31 is supported in suitable bearings 33 formed on the grinding head 34. The head 34 is detachably connected at 35 to a support arm 36 which is pivotally attached at 37 to a bracket 38. The bracket 38 is pivoted at 39 to the support frame or base 27 and is movable toward and away from the lens supporting spindle by a screw member 40 operable by moving the hand wheel 41. The bracket 38 is provided with a depending lip 42 which engages a spring member 43. Spring member 43 is adapted to constantly urge and hold the bracket 38 in contact with the adjusting screw 40. The purpose of moving the bracket 38 about its pivot 39 is to provide means whereby the abrading tool 29 carried by the arm 36 may be adjusted relative to the segment portion B, that is, so that the edge of the tool 29 can be aligned with the contour edge of the segment portion B so that when the said portion B is being ground away its contour edge will eventually be caused to merge with the optical surface 3 on the distance portion of the lens.

The abrading tool 29 is of the rigid type commonly used for abrading ophthalmic lenses and may be either of the ring or lap type. This type of tool is rigidly attached to the grinding spindle and is adapted particularly for use in the roughing or surface shaping operations. In Fig. XIII there is shown a floating or loosely mounted tool 44 of the usual prior art type used primarily for the fining, smoothing and polishing operations. This loose tool 44 is preferably rotated with the grinding spindle by means of a crank pin 45 loosely fitting within a slot 46 formed in the tool but may be supported and driven by any suitable means known in the art. It is to be understood that although applicant has shown a loosely supported tool for performing the fining, smoothing, and polishing operations, such operations may be performed with a rigid type tool if desired.

If desired, before the abrading operations are commenced upon the reading portion of the lens the upper edge of said reading portion may be provided with a filler piece 47, as shown in Fig. IX. This filler piece is made of the same kind of glass as the portion B or other suitable means and is adapted to be temporarily secured in position by any suitable cement commonly known in the art such as Canada balsam, pitch, or other suitable means. The object of securing the filler piece 47 to the upper cliff type edge 6 of the segment portion B is to provide means for supporting the abrading tool 29 during the abrading operation and for preventing the accidental chipping and breaking down of the edge 6 during the abrading operation. This aids in the production of such lenses.

In the selection of glasses for producing lenses of this character the major portion A is formed preferably of the usual prior art, index of refraction 1.52 crown glass used in forming single vision lenses and which has a relatively high melting point. The segment portion B is formed preferably of a glass having a similar index of refraction and reciprocal relative dispersion as that of the glass of the major portion A, but having a lower melting point. It is to be understood that this melting point is such that the segment portion 2 may be fused to the finished optical surface 3 without danger of distorting or otherwise injuring said surface during the fusing operation. The glasses used for forming the distance portion 1 and reading portion 2 may be of any suitable index of refraction as for example 1.523 having a reciprocal relative dispersion of about 58 or glass having a refractive index of 1.6165 and a reciprocal relative dispersion of about 36. Although applicant describes the portion B as being preferably formed of crown glass, the said portion may be formed of any glass such as barium crown, flint, or any other glass having a lower fusing point than the portion A.

The portion B may if desired be provided on its surface 7 with a curvature substantially equal to that of the surface 3 so that the parts will more or less intimately fit each other prior to the fusing operation. This will tend to prevent distortion of the contour of the segment during fusion and will also aid in obtaining a good fusing operation. It is to be understood that the surface 7 does not necessarily have to be contrageneric to the surface 3 in order to obtain good results. But if shaped substantially to the surface curvature 3 it will aid fusion without distortion of the surface 3.

In Figures XIV to XX inclusive there is shown some of the several different shapes to which the contour of the reading fields 2 or portions B may be formed. It is to be understood that applicant has shown these shapes only by way of illustration and that practically any shape may be produced by merely varying the contour edge of the portion B prior to fusing the said portion to the major blank A.

In Figure XIV there is shown a three-quarter circle shaped segment having a relatively thick upper line of joinder 6. This line of joinder may be arched upwardly as shown by the full line 6, may be straight as shown by the dot and dash line 48, or may be curved downwardly as shown by the dot and dash line 49. The optical center 50 of the reading field is shown below the dividing line but it is to be understood that it may be on the dividing line or above or below as desired.

In Figure XV there is shown a half circle type segment wherein the dividing line 6 may be arched upwardly, straight or curved downwardly substantially as described above. In this instance the optical center 50 is shown on the dividing line 6 but may be above or below as desired.

In Figure XVI there is shown an oblong segment having its sides 51 and 52 shaped to lines of revolution and having its upper and lower edges 53 and 54 departing from said lines of revolution, the line 53 being adapted to form the dividing line 6 between the different focal fields of the lens and being preferably arched upwardly. The bottom line 54 is preferably curved downwardly. The optical center 50 is shown preferably in a position below the upper edge 53 but may be on said edge or above or below, as desired.

In Figure XVII there is shown in full lines a rectangular shaped segment. If desired, the rectangular shape may be modified by arching the upper and lower lines upwardly or downwardly as indicated by the dot and dash lines 55 or by curving the sides inwardly or outwardly as indicated by the dot and dash lines 56 as desired, to form variations in the contour shape of such segments.

In Figure XVIII there is shown in full lines a square type segment which may be modified in a manner similar to the rectangular shape described above and illustrated by the dot and dash lines 57 and 58.

In Figure XIX there is shown an oval type segment.

In Figure XX there is shown an odd shaped segment having a relatively long and narrow upper portion with a portion depending therefrom substantially midway of said upper portion. This view is shown primarily to illustrate one of several different irregular shaped segments which may be formed.

In all instances the upper transverse line 6 forms the dividing line between the different focal fields of the lens and the optical centers 50 of each of the above segments regardless of where they are shown in the drawings may be positioned on said dividing line or above or below as desired.

It might be well to state that the purpose of removing the upper portion of the reading fields 2 or of positioning the line of joinder 6 nearer the optical center 50 of said fields is to reduce the commonly known prismatic displacement and distortion encountered when the eye passes from the distance field into the reading field and vice versa, and to provide a much wider entrance area for the eye when passing from one field into the other. It has been found from practice that the nearer the dividing line 6 is placed to the optical center 50 of the reading field, the more prism displacement and distortion will be eliminated. It has been found, however, that by placing the dividing line 6 in such a position relative to the optical center 50, that when the eye passes over said dividing line and its pupil is clear of said line it will immediately fall in the vicinity of the optical center 50 of the reading field and also by placing the dividing line 6 in such a position relative to the optical center 59 of the distance field that when the said pupil clears the dividing line 6 it will immediately fall in the vicinity of the optical center of said distance field, a much more desirable and practical lens will be obtained. Therefore, applicant preferably positions the dividing line 6 and optical centers of both the distance and reading fields at such a relation to each other as to accomplish these results. Although applicant preferably positions the optical center 59 above the dividing line and the optical center 50 below the dividing line the said centers may be placed on said dividing line or either one or the other of said centers may be placed above or below the dividing line as desired.

Referring to Fig. I the following characteristics and advantages of my invention are pointed out:—

The center 59 is the center of curvature of the surface 1 it is the point through which the optical axis of the distance field will pass. The center 50 is the center of curvature of the outer surface 19 of the segment 2 and is the point through which the optical axis of the segment will pass.

The distance from the edge 6 of the segment to the center 59 is substantially that of the radius of the pupil of the human eye, which varies from 4 to 8 millimeters. The distance from the line 6 to the center 50 is also substantially the same distance.

This arrangement presents the ideal bifocal centering because it is clear that when the eye is centered over either the center 59 or the center 50 the pupil is just clear of the line 6. The points 59 and 50 as is well known are the points of best vision of the two fields respectively, hence immediately when the pupil of the eye has cleared the line 6 it is over the best vision of the field where it is operating—other relationships of line 6 and centers 59 and 50 can be made, but the one described is preferred as the ideal condition of centering.

The lens is economical of construction because it is only necessary to fuse the segment 2 on the lens 1, all expensive countersink grinding and edge fusing operations are avoided. The lens lends itself readily to the ideal centering of the parts in desired shaped segments.

Although applicant, by way of illustration, has shown the reading field 2 as having a convex surface 19, the said surface may be made concave if desired, depending upon the power desired in the reading portion of the finished lens. It will also be understood that several of the shapes shown and described above will have combined, merged and cliff type edges depending upon the shape formed and whether or not there is a prism correction in said segment in which instance the base of the prism will be thicker than the apex of said prism.

Prism in lenses as is well known is obtained by a wedge shaped lens. The light is bent toward the thickest edge of the wedge, which is known as the base of the prism. If the surfaces of a lens are ground about the geometric center on the center of curvature of the surfaces, the lens is symmetrical and one side is not thicker than the other, but if a surface is ground about a center of curvature that is displaced from the geometrical center then one side of the lens is thicker than its corresponding opposite side—i. e. the relationship of the surfaces is such as to introduce a wedge shape lens in thickness—a surface generated about the center 50 in Fig. I would be symmetrical and would not introduce prism into the segment 2, but if the surface 19 were ground about a center removed from the center 50, prism would be introduced into the segment 2. This new center may be either in or out, up or down from the center 50 as required so as to place the base of the prism at desired position in or out, up or down, or anywhere required, as is well understood in the art. By surfacing the surface 19 on the segment 2 after it is fused I am enabled simply by locating the center of curvature as required to produce prism or not in the segment as I desire and in the position desired.

The general method of assembling the parts for fusion is as follows:

The major blank or distance portion A is placed in a recess 9 formed in the refractory block 8, it being understood that the major blank A is moulded or otherwise formed to a predetermined size which will fit snugly in the opening 9 so as to locate the said blank at a predetermined position on the block, it being understood that the major blank A has been previously provided with a finished optical surface 3 and that this surface is exposed to receive the segment portion B. The segment portion B is then placed in an opening formed in the support plate 11, which overlies the major blank A, and is held by said plate in predetermined relation with the major blank during the fusing operation. The position of the portion B relative to the major blank is controlled by adjustment of the transverse slide members 12 and 13 relative to the scale and indicator means 16 and 17. The portion 11 is adjusted or raised above the surface 3 and is adapted to engage only the upper contour edge of the portion B during the fusing operation. This is to prevent distorting or otherwise injuring the surface 3 or the usable portion of the contour edge of the portion B during the fusing. The adjustment of the plate 11 upwardly or downwardly is accomplished by sliding the depending supports 15 inwardly and outwardly of their supporting openings in the refractory block 8, it being understood that the said depending portions 15 are bent to obtain a resilient frictional contact with the inner walls of said openings so as to hold the part 11 in its adjusted position. After the parts have been properly located relative to each other they are placed in a suitable furnace and heated to the required temperature to bring about fusion. The optical surface 19 is then formed on the segment portion 2.

If desired, applicant may place a suitable flux such as a soft low melting glass between the engaging surfaces of the parts A and B during the assembling thereof for fusion. In some instances wherein a flux is used the parts may be fused at a much lower temperature.

It is to be understood that when piece 47 is used, such as shown in Fig. IX, to support the abrading tool and to aid in preventing the breaking down of the cliff edge 6 during the abrading operation, the said piece 47 is adapted to be removed after the surface 19 has been abraded.

After the segment side of the lens has been finished with the required surface curvature the opposite surface of the lens is finished to the prescription curvature required to produce the desired power in the finished lens. The lens is then cut and edged to the desired contour shape in the usual prior art manner.

It is apparent that during the positioning of the segment portion 4 relative to the major portion 1 the dividing line 6 may be placed in any desired relation with the optical center 59 of the distance portion. By moving the slide 11 longitudinally of its slide-way and by means of the scale 16 the dividing line 6 may be located in any desired position relative to the optical center 59 or the position at which the said optical center is to be in the finished lens.

One of the prior art difficulties of making a bifocal by making a finished single vision lens, and then securing a finished segmental lens thereon as in the case of the old cement bifocals was that a feather or knife edge segment could not be produced. The edge cracked or splintered out in an uneven line, so it was necessary to leave a relatively thick edge or wall. This was objectionable and caused the final passing out of the cement bifocal as a popular commercial article. By fusing my segment 2 on the main lens, I am enabled to grind down to a knife or feather edge in the same way that so called one piece bifocals are constructed, and thus obtain a lens with the mobility of construction of the old cement bifocals without the disadvantage of that type, something that has not hitherto been done in the art.

Another advantage of my construction over the onepiece form, is that in the onepiece forms the curvature of the outer surface of the segment is very strong or steep, this gives bad chromatic or color abberations, by fusing on my segment I am enabled to use a different kind of glass, a glass of a different index of refraction from the major lens, so I may select a glass for the segment that due to its index of refraction will permit me to use a flatter curve on the outer surface of the segment for the same power of segment, thereby reducing the color disturbance, a very great improvement in some of the strong segments required in the art.

From the foregoing description it will be seen that I have provided simple, efficient and economical means and process of accomplishing all of the objects and advantages of the invention.

Having described my invention, I claim:—

1. The method of making a bifocal or multifocal lens blank having a reading segment fused to a major piece of glass and having a cliff type edge extending outwardly from the surface of said major piece, comprising finishing an optical surface on said major piece, forming an optical surface on the reading segment substantially complemental to said surface on said major piece, said segment having substantial edge thickness, fitting said complemental surfaces and fusing said major piece and said segment together, temporarily securing a piece of glass or material of similar physical properties to act as a filler against the surface on said major piece and substantially in abutting relation to the edge of said segment where said cliff edge will be formed, abrading a continuous surface of a different curvature from the curvature on said major piece over said segment and said filler and decentered relative to said segment until the sides and lower edges of said segment substantially blend into the surface of said major piece, and thereafter removing said filler to leave the cliff edge extending outwardly from the surface of said major piece.

2. The method of making a bifocal or multifocal lens comprising forming a continuous finished lens surface on one side of a major piece of lens medium having a known relatively high melting point and covering substantially the entire area of said side, making a segmental portion of lens medium having a melting point which is lower than the melting point of the major piece and such that the temperature necessary to bring about fusion with said major piece will not cause the finished optical surface on said major piece to be distorted, said segmental portion being formed to the size and shape desired for the finished reading segment of the lens and having one optical surface complemental to one side of said major piece, fitting and securing said segment to said major piece in a predetermined relation to said major piece so that when the other finished surface is placed on said segment a cliff edge will be left at the top of said segment, temporarily securing a piece of vitreous material to act as a filler against the surface on said major piece and substantially in abutting relation to the edge of said segment which is to be the cliff edge, abrading a continuous surface of different curvature from the surface on said major piece over said segment and said filler until the sides and lower edges of said segment substantially blend into the surface of said major piece, and thereafter removing said filler which protected the cliff edge during the abrading operation, leaving the cliff edge extending outwardly from the surface of said major piece.

EDGAR D. TILLYER.